(12) United States Patent
Sun et al.

(10) Patent No.: US 12,508,445 B2
(45) Date of Patent: Dec. 30, 2025

(54) METHOD FOR CONTROLLING RADIATION DELIVERY, COMPUTER DEVICE COMPRISING ONE OR MORE PROCESSORS AND MEMORY, AND STORAGE MEDIUM

(71) Applicants: SHENZHEN OUR NEW MEDICAL TECHNOLOGIES DEVELOPMENT CO., LTD., Shenzhen (CN); OUR UNITED CORPORATION, Xi'an (CN)

(72) Inventors: Bing Sun, Xi'an (CN); Shifeng Fan, Xi'an (CN); Hong Cheng, Xi'an (CN)

(73) Assignees: SHENZHEN OUR NEW MEDICAL TECHNOLOGIES DEVELOPMENT CO., LTD., Shenzhen (CN); OUR UNITED CORPORATION, Xi'an (CN)

( * ) Notice: Subject to any disclaimer, the term of this patent is extended or adjusted under 35 U.S.C. 154(b) by 237 days.

(21) Appl. No.: 18/325,899

(22) Filed: May 30, 2023

(65) Prior Publication Data
US 2023/0381540 A1 Nov. 30, 2023

(30) Foreign Application Priority Data
May 31, 2022 (CN) .......................... 202210609629.0

(51) Int. Cl.
*A61N 5/10* (2006.01)

(52) U.S. Cl.
CPC ............ *A61N 5/1038* (2013.01); *A61N 5/103* (2013.01); *A61N 5/1039* (2013.01); *A61N 5/1048* (2013.01); *A61N 5/1049* (2013.01); *A61N 2005/1052* (2013.01); *A61N 2005/1054* (2013.01); *A61N 2005/1055* (2013.01); *A61N 2005/1061* (2013.01); *A61N 2005/1074* (2013.01)

(58) Field of Classification Search
CPC ........ A61N 5/10; A61N 5/103; A61N 5/1031; A61N 5/1038; A61N 5/1039; A61N 2005/1041; A61N 5/1042; A61N 5/1045; A61N 5/1047; A61N 5/1048; A61N 5/1049; A61N 2005/1052; A61N 2005/1054; A61N 2005/1055; A61N 2005/1061; A61N 5/1064; A61N 5/1065; A61N 5/1067; A61N 2005/1074
USPC ........................................................... 378/65
See application file for complete search history.

(56) References Cited

U.S. PATENT DOCUMENTS 7,024,026 B1 * 4/2006 Ritt ...................... A61N 5/1048
382/128
7,611,452 B2 * 11/2009 Allison .................. A61N 5/103
600/1

(Continued)

*Primary Examiner* — Allen C. Ho
(74) *Attorney, Agent, or Firm* — Kolitch Romano Dascenzo Gates LLC (57) ABSTRACT

The present application discloses a method for controlling radiation delivery. The method for controlling radiation delivery includes: acquiring a plurality of treatment plans for a target object; and sequentially sending, according to a preset delivery order of the plurality of treatment plans, control instructions corresponding to the plurality of treatment plans, so as to control radiotherapy equipment to execute radiation delivery corresponding to the plurality of treatment plans on the target object according to the preset delivery order.

20 Claims, 5 Drawing Sheets

Acquiring a plurality of treatment plans for a target object — S210

Sequentially sending, according to a preset delivery order of the plurality of treatment plans, control instructions corresponding to the plurality of treatment plans, so as to control radiotherapy equipment to execute radiation delivery corresponding to the plurality of treatment plans on the target object according to the preset delivery order — S220

(56) References Cited

U.S. PATENT DOCUMENTS

| | | | | |
|---|---|---|---|---|
| 8,112,292 | B2 * | 2/2012 | Simon | A61B 90/36 |
| | | | | 128/898 |
| 8,229,068 | B2 * | 7/2012 | Lu | A61N 5/1049 |
| | | | | 378/65 |
| 8,331,532 | B2 * | 12/2012 | Nord | A61N 5/1037 |
| | | | | 378/65 |
| 8,767,917 | B2 * | 7/2014 | Ruchala | A61N 5/103 |
| | | | | 378/65 |
| 8,775,207 | B2 * | 7/2014 | Abraham | G16H 20/40 |
| | | | | 378/65 |
| 8,986,186 | B2 * | 3/2015 | Zhang | A61N 5/103 |
| | | | | 600/1 |
| 9,262,590 | B2 * | 2/2016 | Schulz | A61N 5/103 |
| 10,342,994 | B2 * | 7/2019 | Kuusela | A61N 5/1031 |
| 10,507,337 | B2 * | 12/2019 | Willcut | A61N 5/1038 |
| 10,653,894 | B2 * | 5/2020 | Prosser | A61N 5/1048 |
| 10,722,731 | B2 * | 7/2020 | Maltz | A61N 5/1039 |
| 10,870,019 | B2 * | 12/2020 | Fontanarosa | A61N 5/1049 |
| 10,933,257 | B2 * | 3/2021 | Shangguan | A61N 5/1038 |
| 11,013,936 | B2 * | 5/2021 | Cordero Marcos | A61N 5/1039 |
| 11,071,877 | B2 * | 7/2021 | Zhou | A61N 5/1031 |
| 11,235,172 | B2 * | 2/2022 | Thornton | A61N 5/1067 |
| 11,517,767 | B2 * | 12/2022 | Bokrantz | A61N 5/1045 |
| 11,517,768 | B2 * | 12/2022 | Hibbard | A61N 5/1031 |
| 11,537,912 | B2 * | 12/2022 | Niemela | A61N 5/1031 |
| 11,565,126 | B2 * | 1/2023 | Nord | A61N 5/1038 |
| 11,590,362 | B2 * | 2/2023 | Harju | A61N 5/1031 |
| 12,168,145 | B2 * | 12/2024 | Korhonen | A61N 5/1039 |
| 12,370,377 | B2 * | 7/2025 | Janson | A61N 5/1031 |

* cited by examiner

METHOD FOR CONTROLLING RADIATION DELIVERY, COMPUTER DEVICE COMPRISING ONE OR MORE PROCESSORS AND MEMORY, AND STORAGE MEDIUM

This application claims priority to Chinese patent application Ser. No. 202210609629.0, filed on May 31, 2022, and entitled "Radiation delivery control method, computer equipment and storage medium," the content of which is herein incorporated by reference in its entirety.

TECHNICAL FIELD

The present application relates to the field of radiotherapy technologies, in particular to a radiation delivery method, a computer device, and a storage medium.

BACKGROUND OF THE INVENTION

Radiotherapy is a common way to treat tumors and can use high-energy rays generated by radiotherapy equipment to kill tumor lesions.

SUMMARY OF THE INVENTION

Embodiments of the present application provide a method for controlling radiation delivery, a computer device and a storage medium.

The present application provides a method for controlling radiation delivery. The method includes:
acquiring a plurality of treatment plans for a target object; and sequentially sending, according to a preset delivery order of the plurality of treatment plans, control instructions corresponding to the plurality of treatment plans, so as to control radiotherapy equipment to execute radiation delivery corresponding to the plurality of treatment plans on the target object according to the preset delivery order.

In some embodiments of the present application, the control instructions include a setup control instruction and radiation delivery control instructions;
sequentially sending, according to the preset delivery order of the plurality of treatment plans, the control instructions corresponding to the plurality of treatment plans, so as to control the radiotherapy equipment to execute the radiation delivery corresponding to the plurality of treatment plans on the target object according to the preset delivery order includes:
sending, according to the preset delivery order of the plurality of treatment plans, the setup control instruction for a first treatment plan in the plurality of treatment plans to instruct to execute setup on the target object; and
determining that the setup on the target object is completed, and sequentially sending the radiation delivery control instructions corresponding to the plurality of treatment plans, so as to control the radiotherapy equipment to execute the radiation delivery corresponding to the plurality of treatment plans on the target object according to the preset delivery order.

In some embodiments of the present application, the plurality of treatment plans include a first treatment plan and a second treatment plan which are adjacent in delivery order;
determining that the setup on the target object is completed, and sequentially sending the radiation delivery control instructions corresponding to the plurality of treatment plans, so as to control the radiotherapy equipment to execute the radiation delivery corresponding to the plurality of treatment plans on the target object according to the preset delivery order includes:
sending the radiation delivery control instruction corresponding to the first treatment plan to control the radiotherapy equipment to execute radiation delivery corresponding to the first treatment plan on the target object; and
determining that the radiation delivery corresponding to the first treatment plan on the target object by the radiotherapy equipment is completed, and sending the radiation delivery control instruction corresponding to the second treatment plan to control the radiotherapy equipment to execute radiation delivery corresponding to the second treatment plan on the target object.

In some embodiments of the present application, determining that the radiation delivery corresponding to the first treatment plan on the target object by the radiotherapy equipment is completed includes:
determining, according to a radiation delivery state corresponding to the first treatment plan, that the radiation delivery corresponding to the first treatment plan on the target object by the radiotherapy equipment is completed.

In some embodiments of the present application, determining, according to the radiation delivery state corresponding to the first treatment plan, that the radiation delivery corresponding to the first treatment plan on the target object by the radiotherapy equipment is completed includes:
acquiring the radiation delivery state corresponding to the first treatment plan; and
determining, in a case that the radiation delivery state corresponding to the first treatment plan is a preset state, that the radiation delivery corresponding to the first treatment plan on the target object by the radiotherapy equipment is completed; wherein the preset state indicates that the radiation delivery corresponding to the first treatment plan is completed.

In some embodiments of the present application, before sending the radiation delivery control instruction corresponding to the second treatment plan, the method further includes: determining that the second treatment plan exists.

In some embodiments of the present application, after acquiring the plurality of treatment plans for the target object, the method further includes: analyzing the plurality of treatment plans.

In some embodiments of the present application, after acquiring the plurality of treatment plans for the target object, the method further includes: acquiring the preset delivery order of the plurality of treatment plans.

The present application further provides a computer device. The computer device includes one or more processors and a memory storing one or more application programs therein; wherein the one or more processors, when loading and running the one or more application programs, are caused to perform the method for controlling radiation delivery according to any embodiment above.

The present application further provides a non-transitory computer-readable storage medium. One or more computer program is stored on the computer-readable storage medium, and, when loaded and run by a processor, cause the processor to perform the method for controlling radiation delivery according to any embodiment above.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION

In the following, the technical solutions in the embodiments of the present application will be clearly and completely described in combination with the drawings in the embodiments of the present application. Obviously, the described embodiments are only part but not all of the embodiments of the present application. Based on the embodiments in the present application, all other embodiments acquired by those skilled in the art without creative work belong to the protection scope of the present application.

In the descriptions of the present application, it should be understood that the oriental or positional relationships indicated by the terms such as "central", "longitudinal", "lateral", "length", "width", "thickness", "upper", "lower", "front", "back", "left", "right", "vertical", "horizontal", "top", "bottom", "inside" and "outside" are based on the oriental or positional relationships shown in the accompanying drawings, only for the convenience of describing the present application and simplifying the descriptions, without indicating or implying that the apparatuses or elements referred to must have a specific orientation, and be constructed and operated in a specific orientation, and thus cannot be understood as a limitation to the present application. In addition, the terms "first", "second" and "third" are only configured for descriptive purposes, and cannot be understood as indicating or implying relative importance or implicitly indicating the number of indicated technical features. Therefore, the features defined as "first", "second" and "third" can explicitly or implicitly include one or more of said features. In the descriptions of the present application, "plurality of" means two or more, unless otherwise specifically defined.

In the present application, the word "exemplary" is configured to mean "serving as an example, illustration or explanation". Any embodiment described as "exemplary" in the present application is not necessarily to be construed as more preferred or advantageous than other embodiments. In order to enable any person skilled in the art to be capable of implementing and using the present application, the following descriptions are given. In the following descriptions, for the purpose of explanation, details are set forth. It should be understood that a person of ordinary skill in the art will recognize that the present application can be practiced without these specific details. In other instances, well-known structures and processes are not set forth in detail to avoid obscuring the descriptions of the present application with unnecessary details. Therefore, the present application is not intended to be limited to the illustrated embodiments, but is to be consistent with the widest scope complying with the principles and features disclosed in the present application.

It should be noted that the method in the embodiments of the present application is executed in a computer device, and processing objects of respective computer devices all exist in the form of data or information, for example, time, which is essentially time information. It is understandable that if the size, quantity, location and so on are mentioned in the subsequent embodiments, all the corresponding data exist for the computer device to process, and the details are not repeated here.

Usually, when radiotherapy is performed on a patient's tumor, a radiotherapy plan is firstly made according to the situation of the patient's tumor, and then radiotherapy equipment applies an expected radiation dose to the patient's tumor according to the treatment plan, so as to realize the treatment of the patient's tumor.

In related art, a control system of the radiotherapy equipment only supports the control of single-plan treatment, that is, by executing the control flow once, the treatment of only one treatment plan can be completed. When the same patient has multiple treatment plans to be delivered in one day, the control system of the radiotherapy equipment in the related art needs to execute control for multiple times, which cannot realize one-time treatment control of multiple treatment plans.

The embodiments of the present application provide a method for controlling radiation delivery, a computer device and a storage medium. The method for controlling radiation delivery relates to the radiation delivery of multiple treatment plans for the same patient on the same day. In some embodiments, the radiation delivery corresponding to multiple treatment plans for the patient can be achieved by executing the flow from plan acquisition to treatment end once.

Figure 1:
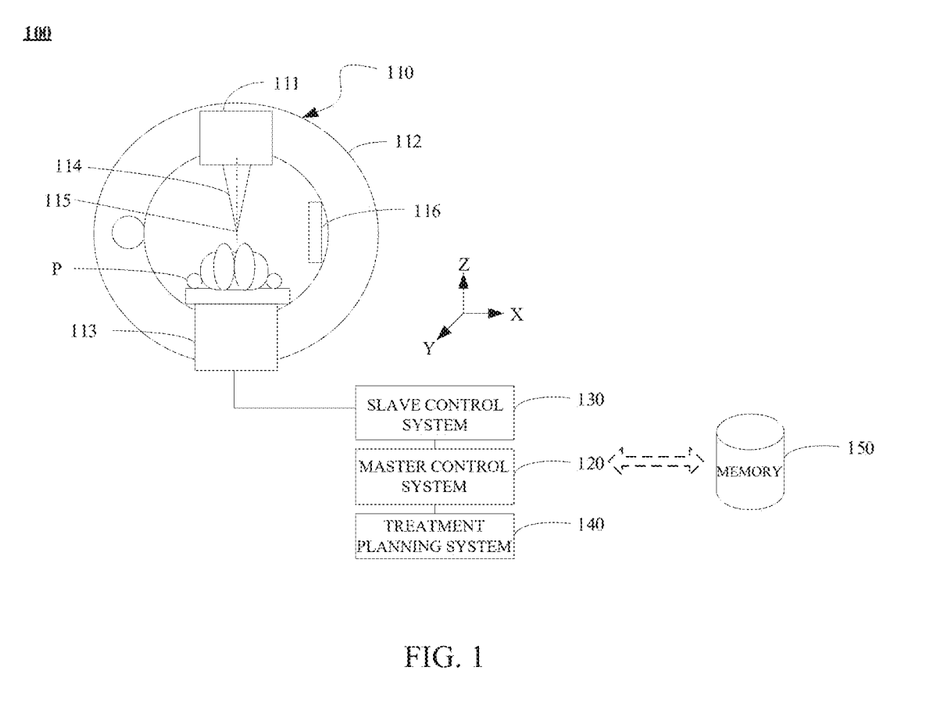
FIG. 1 is a schematic scene diagram of radiotherapy equipment according to some embodiments of the present application.

FIG. 1 exemplarily shows radiotherapy equipment 100. The radiotherapy equipment 100 includes a radiation delivery apparatus 110, a master control system 120, a slave control system 130, a treatment planning system (TPS) 140, and a memory 150. In some embodiments, the radiation delivery apparatus 110, the master control system 120, the slave control system 130, the treatment planning system 140, and the memory 150 are connected and/or communicated with each other via wireless connection (for example, network connection), wired connection, or a combination thereof.

In some embodiments, the radiation delivery apparatus 110 is an apparatus delivering radiotherapy. The radiation delivery apparatus 110 includes a radiation source 111, a rotatable gantry 112, and a treatment couch 113.

The radiation source 111 generates or emits a radiation beam 114. The radiation source 111 includes a linear accelerator and a treatment head loaded with a radioisotope source (for example, a cobalt 60 radiation source). The number of the radiation sources 111 is one or multiple, for example, two.

The rotatable gantry 112 is configured to support the radiation source 111 and can drive the radiation source 111 to rotate around a rotation axis 115, and the rotation axis 115 and a central axis of the radiation beam 114 intersect at a central point.

The treatment couch 113 is configured to carry the patient P, and the treatment couch 113 can translate in one or more of three orthogonal directions (shown as X, Y and Z directions in FIG. 1). In some embodiments, the treatment couch 113 also rotates around any one or more of the X, Y and Z axes.

The position of the radiation source 111 relative to the patient and the orientation of the radiation beam 114 relative to the patient are achieved by controlling movement of the rotatable gantry 112 and/or the treatment couch 113.

In some embodiments, the radiation delivery apparatus 110 further includes an image guiding apparatus 116. The image guiding apparatus 116 is configured to provide a medical image for determining at least a part of the patient (for example, a region of interest) to guide the delivery of radiotherapy. In some embodiments, the image guiding apparatus 116 is, for example, CT equipment, cone-beam CT equipment, PET equipment, volume CT equipment, MRI equipment, etc., or a combination thereof.

In some embodiments, the master control system 120 is configured to generate control instructions for one or more components of the radiotherapy equipment 100 (such as the slave control system 130, the treatment planning system 140, and the memory 150). For example, the master control system 120 sends instructions to the slave control system 130 to control the radiation delivery apparatus 110 to start an image guidance or treatment process. For another example, the master control system 120 sends instructions to the treatment planning system 140 and acquires the treatment plans. In some embodiments, the instructions are input by a user (for example, a doctor) via a user interface of the master control system 120.

In some embodiments, the slave control system 130 is configured to control the radiation delivery apparatus 110 to execute corresponding actions in response to the control instructions generated by the master control system 120. For example, the slave control system 130 controls the movement of the treatment couch 113 of the radiation delivery apparatus 110 according to a setup instruction issued by the master control system 120 to complete the setup. For another example, the slave control system 130 controls the movement of the rotatable gantry 112 of the radiation delivery apparatus 110 according to a radiation delivery instruction issued by the master control system 120 to realize radiation delivery.

In some embodiments, the treatment planning system 140 is configured to determine the treatment plans according to a planned image of the patient (the planned image is acquired by the patient with an imaging apparatus before treatment) and/or based on at least part of an object (for example, a tumor) represented in the image acquired by the image guiding apparatus 116.

In some embodiments, each of the master control system 120 and the treatment planning system 140 is a computer device with a graphical user interface (GUI). The computer device includes one or more processors, a memory and one or more application programs. For example, one or more application programs in the master control system 120 are stored in the memory and configured to be executed by the processor to implement the method for controlling radiation delivery according to the present application. For another example, one or more application programs in the master control system 120 are configured to be executed by the processor to realize the determination of a delivery order of multiple treatment plans described in the present application. In some embodiments, the graphical user interface of the master control system 120 is configured to display delivery state information of multiple treatment plans described in the present application.

In some embodiments, the master control system 120 and the treatment planning system 140 are independent servers or a server network or server cluster composed of servers. For example, the computer device described in the embodiments of the present application includes, but not limited to, a computer, a network host, a single network server, multiple network server sets or a cloud server composed of multiple servers. The cloud server is composed of a large number of computers or network servers based on cloud computing.

In some embodiments, the master control system 120 and the treatment planning system 140 are a general-purpose computer device or a special-purpose computer device. In concrete implementation, the computer device is a desktop, a portable computer, a network server, a personal digital assistant (PDA), a mobile phone, a tablet computer, a wireless terminal device, a communication device, an embedded device, etc. This embodiment does not limit types of the computer device.

In some embodiments, the slave control system 130 is a computer device. The computer device includes a processor, a storage device, an input/output (I/O) and a communication port. The processor 310 includes a microcontroller, a microprocessor, a reduced instruction set computer (RISC), an application specific integrated circuit (ASIC), an application specific instruction set processor (ASIP), a central processing unit (CPU), a graphics processor (GPU), a physical processor (PPU), a single chip microcomputer, a digital signal processor (DSP), a field programmable gate array (FPGA), an advanced reduced instruction set system (ARM), a programmable logic device (PLD), any circuit or processor capable of executing at least one function, or any combination thereof.

When the radiotherapy equipment 100 according to the present embodiment executes radiotherapy, the master control system 120 acquires the treatment plans for treatment of a patient's tumor from the treatment planning system 130, and issues the acquired treatment plans and the control instructions to the slave control system 130, and the slave control system 130 controls the radiation delivery apparatus 110 to deliver radiotherapy to the patient's tumor according to treatment plan information and the control instructions.

In some embodiments, the radiotherapy equipment 100 also includes one or more other computer devices that can process data. For example, an oncology information system (OIS) is configured to schedule the treatment plans for the patient and store treatment data (such as image data, treatment plan data and radiation delivery information of the patient).

The memory 150 stores the data, the instructions and/or any other information. In some embodiments, the memory 150 stores the data acquired from the treatment planning system 140. In some embodiments, the memory 150 stores the data and/or instructions used by the master control system 120 to execute the exemplary methods described in the present application. In some embodiments, the memory 150 includes a mass memory, a mobile memory, a volatile read-write memory, a read-only memory (ROM), etc., or any combination thereof. Exemplary, the mass memory includes a magnetic disk, an optical disk, a solid-state drive, etc. Exemplary, the mobile memory includes a flash drive, a floppy disk, an optical disk, a memory card, a compact disk, a magnetic tape, etc. Exemplary, the volatile read-write memory includes a random access memory (RAM). Exemplary, the RAM includes a dynamic random access memory (DRAM), a double data rate synchronous dynamic random access memory (DDR SDRAM), a static random access memory (SRAM), a thyristor random access memory (T-RAM), a zero capacitance random access memory (Z-RAM), etc. Exemplary, the ROM includes a mask ROM (MROM), a programmable ROM (PROM), an erasable programmable ROM (EPROM), an electrically erasable programmable ROM (EEPROM), a compact disc ROM (CD-ROM), a digital versatile disk ROM, etc. In some embodiments, the memory 150 is implemented on a cloud platform. For example only, the cloud platform includes a private cloud, a public cloud, a hybrid cloud, a community cloud, a distributed cloud, an internal cloud, a multi-tier cloud, etc., or any combination thereof.

In some embodiments, the memory 150 is connected to a network to communicate with one or more other components of the radiotherapy equipment 100 (such as the master control system 120, the treatment planning system 140, and the oncology information system). One or more components of the radiotherapy equipment 100 accesses the data or instructions stored in the memory 150 via the network. In some embodiments, the memory 150 is directly connected to or in communication with one or more other components of the radiotherapy equipment 100 (such as the master control system 120, the treatment planning system 140, and the oncology information system). In some embodiments, the memory 150 is a part of the master control system 120, the treatment planning system 140, and the oncology information system.

It should be noted that the schematic scene diagram of the radiotherapy equipment shown in FIG. 1 is only an example. The radiotherapy equipment and the scene described in the embodiments of the present application are for more clearly explaining the technical solutions of the embodiments of the present application, and do not constitute a limitation to the technical solutions according to the embodiments of the present application. It is known by a person of ordinary skill in the art that with the evolution of the radiotherapy equipment and emergence of new business scenes, the technical solutions according to the embodiments of the present application are also applicable to similar technical problems.

Firstly, the embodiments of the present application provide a method for controlling radiation delivery, an execution subject of the method for controlling radiation delivery is a processor in a computer device, and the method for controlling radiation delivery includes the following steps.

A plurality of treatment plans for a target object are acquired; and according to a preset delivery order of the plurality of treatment plans, control instructions corresponding to the plurality of treatment plans are sequentially sent to control the radiotherapy equipment to execute radiation delivery corresponding to the plurality of treatment plans on the target object according to the preset delivery order.

Figures 2, 3:
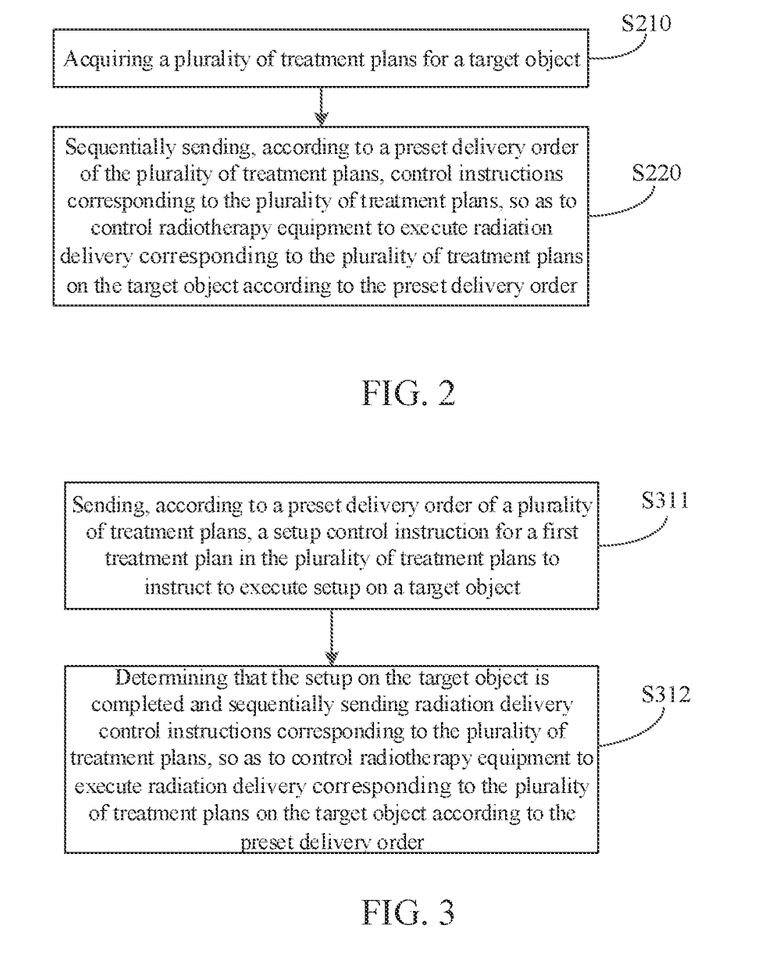
FIG. 2 is a flowchart of a method for controlling radiation delivery according to some embodiments of the present application.
FIG. 3 is a flowchart of another method for controlling radiation delivery according to some embodiments of the present application.

FIG. 2 is a flowchart of a method for controlling radiation delivery according to some embodiments of the present application. As shown in FIG. 2, the method for controlling radiation delivery includes the following steps S210-S220.

S210: a plurality of treatment plans for a target object are acquired.

The processor in a computer device acquires the plurality of treatment plans for the target object, and the plurality of treatment plans are treatment plans of which the radiation delivery needs to be completed by the target object on the same day. The target object generally refers to the patient who needs to receive radiotherapy.

Each of the plurality of treatment plans includes a plurality of treatment parameters, including, but not limited to, the parameters such as beam energy, intensity, direction, size and/or shape.

In some embodiments, the plurality of treatment plans include treatment plans of the same or different machine types, the treatment plans of the same or different plan types, the treatment plans for different treatment positions of the patient, or any combination thereof.

In some embodiments, the plurality of treatment plans are the treatment plans of the same or different machine types. For example, the plurality of treatment plans are all gamma knife treatment plans or accelerator treatment plans. For another example, the plurality of treatment plans are part of accelerator treatment plans and part of gamma knife treatment plans.

In some embodiments, the plurality of treatment plans are the treatment plans of the same or different plan types. For example, the plurality of treatment plans are all IMRT treatment plans or VMAT treatment plans or 3D-CRT treatment plans. For another example, the plurality of treatment plans are any combination of the IMRT treatment plans, the VMAT treatment plans and the 3D-CRT treatment plans.

In some embodiments, the plurality of treatment plans are the treatment plans for different treatment positions of the patient. For example, the plurality of treatment plans are part of treatment plans for a patient's head and part of treatment plans for a patient's body.

In some embodiments, the plurality of treatment plans are any combination of the treatment plans of the same or different machine types, the treatment plans of the same or different plan types, and the treatment plans for different treatment positions of the patient. For example, the plurality of treatment plans include the gamma knife treatment plans and also include the accelerator treatment plans, wherein the gamma knife treatment plans include the gamma knife treatment plan for the patient's head and also include the gamma knife treatment plan for the patient's body, and the accelerator treatment plans include the VMAT treatment plan and the 3D-CRT treatment plan.

It may be understood that the machine types described in the embodiments of the present application are not limited to the gamma knife and accelerator, the plan types are not limited to the IMRT treatment plan, VMAT treatment plan and 3D-CRT treatment plan, and the treatment positions are not limited to the head and body.

In the embodiments of the present application, the plurality of treatment plans are generated by the treatment planning system of the radiotherapy equipment. In some embodiments, before radiation delivery, the plurality of treatment plans are generated by the treatment planning system according to patient's planned images (such as CT images or MRI images), and stored in the treatment planning system for acquisition by the processor of the computer device for executing the method for controlling radiation delivery according to the present application. In some embodiments, after the treatment planning system completes the generation of the plurality of treatment plans, the generated plurality of treatment plans are transmitted to the oncology information system, and the plurality of treatment plans are stored in the oncology information system for acquisition by the processor of the computer device for executing the method for controlling radiation delivery according to the present application. In some embodiments, after the treatment planning system completes the generation of the plurality of treatment plans, the generated plurality of treatment plans are stored in an external storage device (for example, a U disk) for acquisition by the processor of the computer device for executing the method for controlling radiation delivery according to the present application. In some embodiments, after the treatment planning system completes the generation of the plurality of treatment plans, the generated plurality of treatment plans are stored on a local end of the computer device for executing the method for controlling radiation delivery according to the present application for acquisition by its processor.

S220: according to a preset delivery order of the plurality of treatment plans, control instructions corresponding to the plurality of treatment plans are sequentially sent to control radiotherapy equipment to execute radiation delivery corresponding to the plurality of treatment plans on the target object according to the preset delivery order.

After acquiring the plurality of treatment plans for the target object, the processor of the computer device sequentially sends the control instructions corresponding to the plurality of treatment plans according to the preset delivery order of the acquired plurality of treatment plans, so as to control the radiotherapy equipment to execute the radiation delivery corresponding to the plurality of treatment plans on the target object according to the preset delivery order.

In the embodiments of the present application, since the plurality of treatment plans are the treatment plans needing to be delivered to the same patient on the same day, it is necessary to determine a delivery order of the plurality of treatment plans before the radiation delivery.

In some embodiments, the delivery order of the plurality of treatment plans are determined in advance, and the method for controlling radiation delivery according to the embodiment of the present application further includes: acquiring the preset delivery order of the plurality of treatment plans after acquiring the plurality of treatment plans for the target object.

In some embodiments, for example, the preset delivery order are predetermined by the oncology information system of the radiotherapy equipment. That is, after receiving the plurality of treatment plans transmitted from the treatment planning system 140, the oncology information system schedules the plurality of treatment plans (i.e., determines the delivery order of the plurality of treatment plans), and then transmits the plurality of treatment plans and the determined delivery order to the computer device for executing the method for controlling radiation delivery according to the present application.

In some embodiments, the delivery order of the plurality of treatment plans is predetermined by the computer device for executing the method for controlling radiation delivery according to the present application. That is, the computer device for executing the method for controlling radiation delivery according to the present application determines the delivery order of the plurality of treatment plans after acquiring the plurality of treatment plans from the treatment planning system 140, and acquires the determined delivery order before controlling the radiation delivery.

In some embodiments, a control flow for the radiation delivery corresponding to the plurality of treatment plans includes: firstly, the computer device (i.e., the master control system 120 of the radiotherapy equipment 100) for executing the method for controlling radiation delivery according to the present application acquires the plurality of treatment plans for the patient and the preset delivery order of the plurality of treatment plans, and sequentially sends the control instructions corresponding to the plurality of treatment plans to the slave control system 130 according to the preset delivery order of the plurality of treatment plans; correspondingly, according to the preset delivery order, after receiving the control instructions corresponding to the treatment plans, the slave control system 130 controls the radiation delivery apparatus 110 to execute the radiation delivery corresponding to the treatment plans on the target object.

In the method for controlling radiation delivery according to the embodiments of the present application, the plurality of treatment plans for the target object are acquired at one time, so that one-time treatment control of the plurality of treatment plans is realized.

FIG. 3 is a flowchart of another method for controlling radiation delivery according to some embodiments of the present application. The method for controlling radiation delivery is applied to a processor in a computer device.

In some embodiments, as shown in FIG. 3, the control instructions include a setup instruction and radiation delivery control instructions; sequentially sending the control instructions corresponding to the plurality of treatment plans according to the preset delivery order of the plurality of treatment plans, so as to control the radiotherapy equipment to execute the radiation delivery corresponding to the plurality of treatment plans on the target object according to the preset delivery order includes the following steps.

S311: according to the preset delivery order of the plurality of treatment plans, the setup control instruction for the first treatment plan in the plurality of treatment plans is sent to instruct to execute setup on the target object.

Figure 4:
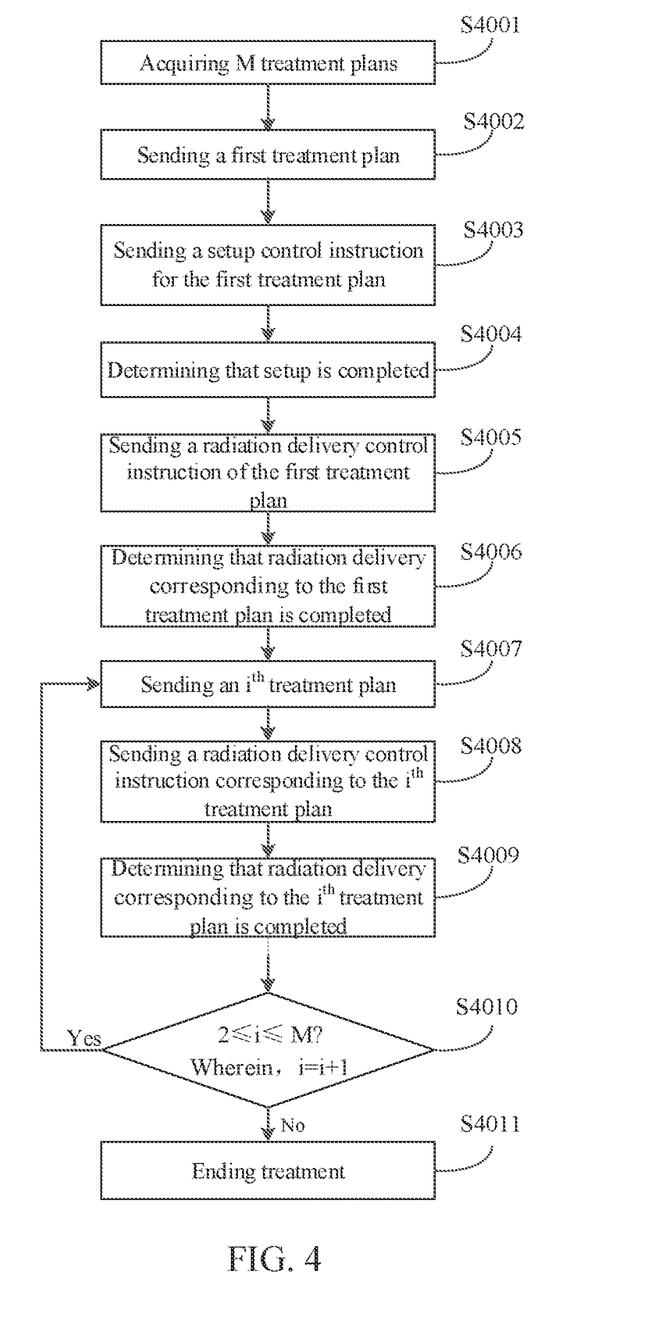
FIG. 4 is a flowchart of yet another method for controlling radiation delivery according to some embodiments of the present application.

In some embodiments, as shown in steps S4001-S4003 in FIG. 4, after the processor of the computer device (for example, the master control system 120 of the radiotherapy equipment 100) for executing the method for controlling radiation delivery according to the present application acquires the plurality of treatment plans for the target object, firstly, according to the preset delivery order of the plurality of treatment plans, the processor sends the first treatment plan in the plurality of treatment plans to the slave control system 130 of the radiotherapy equipment 100, and after the slave control system 130 receives the first treatment plan, the master control system 120 sends the setup control instruction for the first treatment plan to the slave control system 130 to instruct the slave control system 130 to position the target object. That is, after receiving the setup control instruction for the first treatment plan, the slave control system 130 controls the treatment couch 113 of the radiation delivery apparatus 110 to move from a zero position to a target setup position according to setup information of the first treatment plan.

S312: it is determined that the setup of the target object is completed, and the radiation delivery control instructions corresponding to the plurality of treatment plans are sequentially sent, so as to control the radiotherapy equipment to execute the radiation delivery corresponding to the plurality of treatment plans on the target object according to the preset delivery order.

In some embodiments, as shown in step S4004 in FIG. 4, the slave control system 130 sends a setup completion signal to the master control system 120 after controlling the treatment couch 113 of the radiation delivery apparatus 110 to complete the setup, and the master control system 120 determines that the setup of the target object is completed after receiving the setup completion signal.

In some embodiments, determining that the setup of the target object is completed, and sequentially sending the radiation delivery control instructions corresponding to the plurality of treatment plans, so as to control the radiotherapy equipment to execute the radiation delivery corresponding to the plurality of treatment plans on the target object according to the preset delivery order includes the steps S4005-S4011 as shown in FIG. 4.

After the setup of the target object is completed, the master control system 120 sends the radiation delivery control instruction corresponding to the first treatment plan to the slave control system 130, and after receiving the radiation delivery control instruction corresponding to the first treatment plan, the slave control system 130 controls the radiation delivery apparatus 110 of the radiotherapy equipment 100 to execute radiation delivery corresponding to the first treatment plan on the target object.

After determining that the radiation delivery corresponding to the first treatment plan is completed, the master control system 120 sends a second treatment plan to the slave control system 130. After the slave control system 130 receives the second treatment plan, the master control system 120 sends the radiation delivery control instruction corresponding to the second treatment plan to the slave control system 130. After the slave control system 130 receives the radiation delivery control instruction corresponding to the second treatment plan, according to target delivery position information of the second treatment plan and actual position information of the treatment couch 113 when the radiation delivery corresponding to the first treatment plan is completed, the position of the treatment couch 113 is adjusted to a target delivery position of the second treatment plan, and the radiation delivery corresponding to the second treatment plan is started for the target object.

After determining that the radiation delivery corresponding to the second treatment plan is completed, the master control system 120 sends a third treatment plan to the slave control system 130. After the slave control system 130 receives the third treatment plan, the master control system 120 sends the radiation delivery control instruction corresponding to the third treatment plan to the slave control system 130. After the slave control system 130 receives the radiation delivery control instruction corresponding to the third treatment plan, according to the target delivery position information of the third treatment plan and actual position information of the treatment couch 113 when the radiation delivery corresponding to the second treatment plan is completed, the position of the treatment couch 113 is adjusted to a target delivery position of the third treatment plan, and the radiation delivery corresponding to the third treatment plan is started for the target object.

By analogy, the above control process (S4007-S4010 in FIG. 4) is repeated until the radiation delivery corresponding to all the plurality of treatment plans is completed, and the treatment is ended. The first treatment plan and the second treatment plan, and the second treatment plan and the third treatment plan are all treatment plans which are adjacent in delivery order.

In the embodiments of the present application, since the plurality of treatment plans can be acquired at one time, the patient only needs to be positioned once according to the target delivery position of the first treatment plan when the radiotherapy equipment is controlled to implement the delivery radiation corresponding to the first treatment plan on the patient; when the radiotherapy equipment is controlled to implement the radiation delivery corresponding to the follow-up treatment plan, it is only necessary to adjust the treatment couch to the target delivery position of the follow-up treatment plan according to the delivery target position information of the follow-up treatment plan and the actual position information of the treatment couch when the radiation delivery corresponding to the currently delivered treatment plan is completed, without a need of repeated setup, thereby shortening the radiation delivery time of the plurality of treatment plans and improving a utilization rate of the radiotherapy equipment.

In some embodiments, before the radiation delivery control instruction corresponding to the next treatment plan (such as the second treatment plan or the third treatment plan) is sent, the method for controlling radiation delivery according to the embodiments of the present application further includes determining that the next treatment plan exists.

As shown in FIG. 4, in some embodiments, whether the next treatment plan exists is judged through step S4010. When the next treatment plan exists, that is, when the judgment result of step S4010 in FIG. 4 is YES, step S4007 is executed, that is, the radiation delivery corresponding to the next treatment plan is continuously controlled; when no next treatment plan exists, that is, when the judgment result of step S4010 in FIG. 4 is NO, step S4011 is executed to end the treatment.

In some embodiments, the master control system 120 determines that the radiation delivery corresponding to the currently delivered treatment plan is completed according to a radiation delivery state corresponding to the currently delivered treatment plan (such as the first treatment plan or the second treatment plan).

As shown in FIG. 3, in some embodiments, during the radiation delivery corresponding to the currently delivered treatment plan, the master control system 120 continuously acquires the radiation delivery state corresponding to the currently delivered treatment plan to determine whether the radiation delivery corresponding to the currently delivered treatment plan is completed. In some embodiments, during the radiation delivery, one treatment plan includes a plurality of radiation delivery states. Exemplarily, the radiation delivery states include a Preparation state, a Prepare state, a Ready state, a Radiation state, a Complete state, and the like.

In some embodiments, when the radiation delivery state corresponding to the currently delivered treatment plan acquired by the master control system 120 is a preset state, it is determined that the radiation delivery corresponding to the currently delivered treatment plan on the target object by the radiotherapy equipment is completed.

The preset state indicates that the radiation delivery corresponding to the currently delivered treatment plan is completed, for example, the Complete state.

Figure 5:
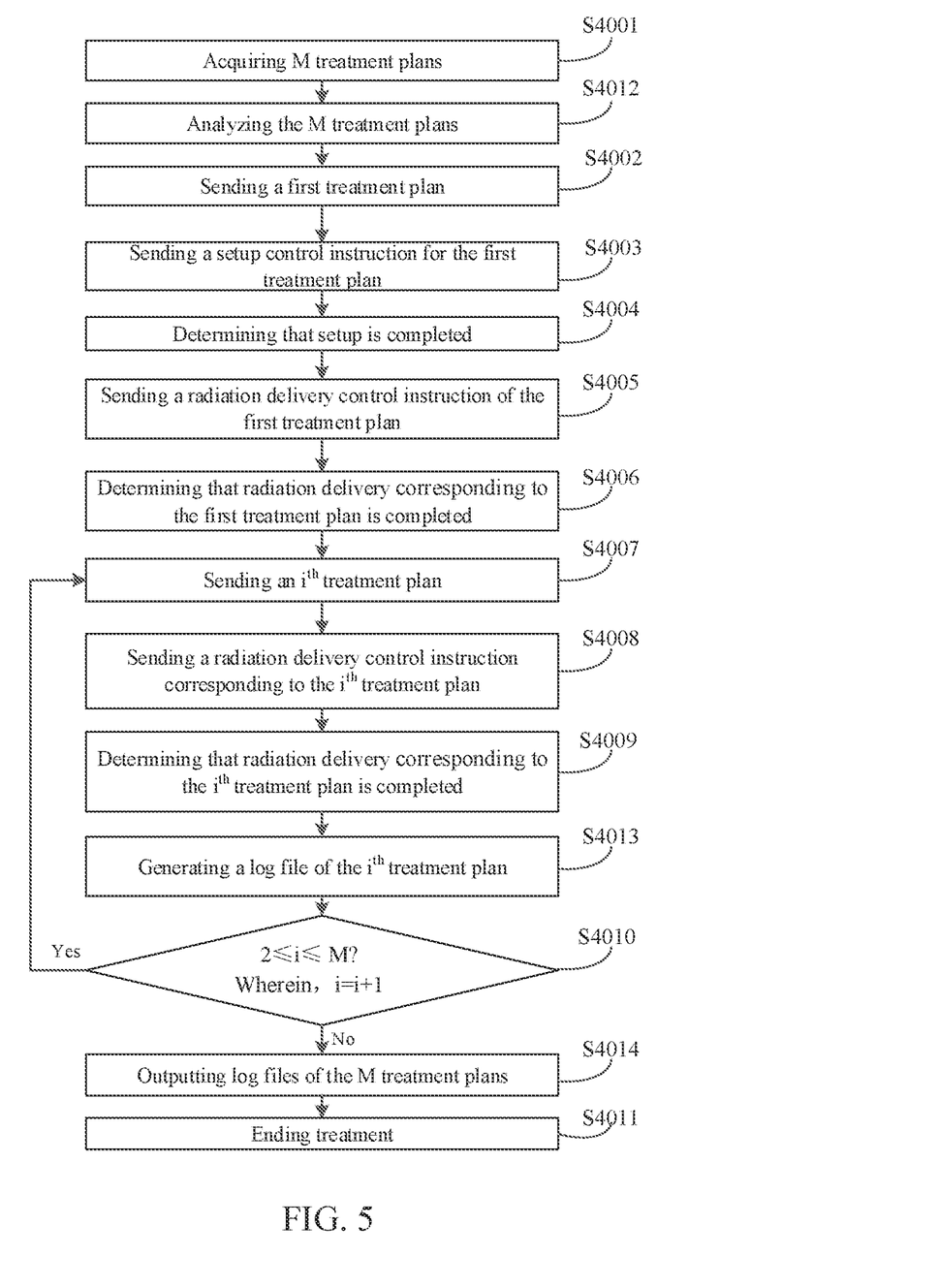
FIG. 5 is a flowchart of still another method for controlling radiation delivery according to some embodiments of the present application.

FIG. 5 is a flowchart of another method for controlling radiation delivery according to some embodiments of the present application. The method for controlling radiation delivery is applied to a processor in a computer device.

In some embodiments, after acquiring the plurality of treatment plans for the target object, the method for controlling radiation delivery according to the present application further includes the step of analyzing the plurality of treatment plans.

As shown in FIG. 5, in some embodiments, through step S4012, the acquired plurality of treatment plans are analyzed. In some embodiments, in step S4012, the analysis of the plurality of treatment plans is completed at one time. As shown in FIG. 5, after the analysis of the plurality of treatment plans is completed, the control instructions corresponding to the plurality of treatment plans are sent sequentially according to the preset delivery order of the plurality of treatment plans, so as to control the radiotherapy equipment to execute the radiation delivery corresponding to the plurality of treatment plans on the target object according to the preset delivery order.

In some embodiments, in step S4012, only the first treatment plan is analyzed. Before step S4007, the step of analyzing the treatment plan needing to be currently delivered is added, that is, the analysis of the treatment plan needing to be currently delivered is executed before step S4007, after the radiation delivery corresponding to the treatment plan needing to be currently delivered is completed and when the next treatment plan exists, the analysis step before step S4007 is returned to execute the analysis of the next treatment plan.

The analysis refers to a process of extracting treatment plan parameters from the treatment plan.

In some embodiments, after determining that the radiation delivery corresponding to the currently delivered treatment plan is completed, and before judging whether the next treatment plan exists, the method for controlling radiation delivery further includes: generating a log file of the currently delivered treatment plan to record actual radiation delivery information of the currently delivered treatment plan.

In some embodiments, as shown in FIG. 5, the log file of the currently delivered treatment plan is generated through step S4013 to record the actual radiation delivery information of the currently delivered treatment plan. The actual radiation delivery information includes a delivery state corresponding to the currently delivered treatment plan, actual setup information of the patient, actual irradiation dose information, actual irradiation angle information, etc.

In some embodiments, when it is determined that no next treatment plan exists, log files of the plurality of treatment plans are output.

As shown in FIG. 5, in some embodiments, when the judgment result of step S4010 is NO, that is, the radiation delivery of all the plurality of treatment plans is completed, step S4014 is executed to output the log files of all the plurality of treatment plans at one time.

The output log files of the plurality of treatment plans, also called treatment records, are for later lookup and reference.

Figure 6:
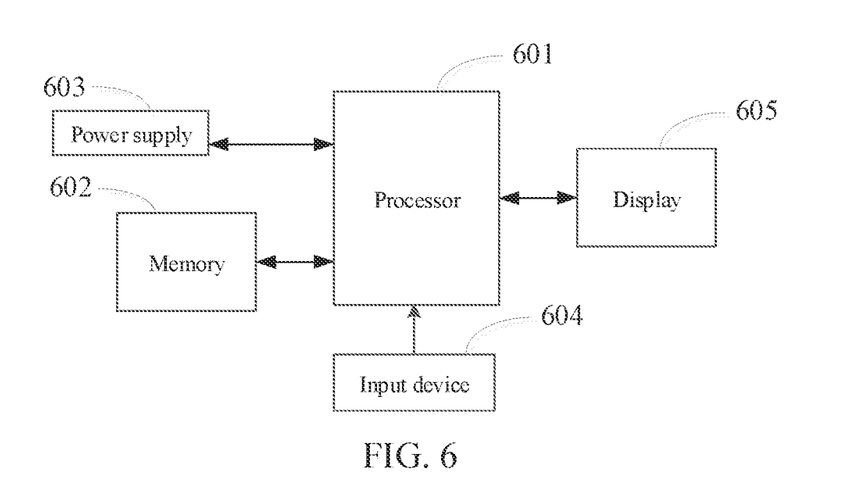
FIG. 6 is a schematic structural diagram of a computer device according to some embodiments of the present application.

The embodiments of the present application also provide a computer device. The computer device includes one or more processors; a memory; and one or more application programs, wherein the one or more application programs are stored in the memory and configured for the processor to execute the steps of the method for controlling radiation delivery in any one of the above embodiments of the method for controlling radiation delivery. The embodiments of the present application also provide a computer device, as shown in FIG. 6, which shows the schematic structural diagram of the computer device involved in the embodiments of the present application.

The computer device includes a processor 601 of one or more processing cores, a memory 602 of one or more computer-readable storage mediums, a power supply 603, an input device 604 and other components. It may be understood by those skilled in the art that the computer device structure shown in FIG. 4 does not constitute a limitation to the computer device, and includes more or less components than shown, or combine some components, or have different component arrangements.

The processor 601 is a control center of the computer device, which connects respective parts of the whole computer device with various interfaces and circuits, and executes various functions and processes data of the computer device by running or executing software programs and/or modules stored in the memory 602 and calling data stored in the memory 602, thereby monitoring the computer device as a whole.

Optionally, the processor 601 includes one or more processing cores; preferably, the processor 601 integrates an application processor and a modem processor, wherein the application processor mainly handles an operating system, a user interface, application programs, etc., and the modem processor mainly handles wireless communication. It may be understood that the above modem processor may not be integrated into the processor 601.

The memory 602 is configured to store the software programs and modules, and the processor 601 executes various functional applications and data processing by running the software programs and modules stored in the memory 602. The memory 602 mainly includes a storage program area and a storage data area, wherein the storage program area stores the operating system, the application programs required by at least one function (such as a sound playing function and an image playing function), etc.; the storage data area stores data created according to use of the computer device, etc. In addition, the memory 602 includes a high-speed random access memory, and also includes a non-volatile memory, such as at least one disk memory device, a flash memory device, or other volatile solid-state memory devices. Accordingly, the memory 602 also includes a memory controller to provide access to the memory 602 by the processor 601.

The computer device also includes the power supply 603 for supplying power to various components. Optionally, the power supply 603 is logically connected to the processor 601 through a power management system, so as to realize functions such as charging and discharging management and power consumption management through the power management system. The power supply 603 also includes one or more DC or AC power supplies, a recharging system, a power failure detection circuit, a power converter or inverter, a power state indicator and any other components.

The computer device also includes the input device 604. The input device 604 is configured to receive input digital or character information and generate keyboard, mouse, joystick, optical or trackball signal inputs related to user settings and function control.

Although not shown, the computer device also includes a display device 605, etc. The display device 605 is a display, which will not be repeated in detail here. Specifically, in some embodiments, the processor 601 in the computer device loads executable files corresponding to the processes of one or more application programs into the memory 602 according to the following instructions, and the processor 601 runs the application programs stored in the memory 602, thereby realizing various functions, as follows.

A plurality of treatment plans are acquired; radiation delivery corresponding to the plurality of treatment plans is controlled according to a delivery order of the plurality of treatment plans.

It may be understood by a person of ordinary skill in the art that all or part of the steps in various methods of the above embodiments are completed by instructions or by controlling related hardware by instructions, and the instructions are stored in a computer-readable storage medium and loaded and executed by the processor.

Therefore, the embodiments of the present application provide a computer-readable storage medium. The storage medium includes a read only memory (ROM), a random access memory (RAM), a magnetic disk or an optical disk, etc. One or more computer programs are stored on the storage medium, and the one or more computer programs are loaded and run by a processor to execute the steps in any method for controlling radiation delivery according to the embodiments of the present application. For example, when the one or more computer programs are loaded and run by the processor, the following steps are executed.

A plurality of treatment plans for a target object are acquired.

According to a preset delivery order of the plurality of treatment plans, control instructions corresponding to the plurality of treatment plans are sequentially sent to control radiotherapy equipment to execute radiation delivery corresponding to the plurality of treatment plans on the target object according to the preset delivery order.

In the above embodiments, the description of each embodiment has its own emphasis. For the parts that are not detailed in one certain embodiment, please refer to the detailed descriptions of other embodiments above, which will not be repeated here.

During specific implementation, the above various structures are implemented as independent entities, and may also be freely combined to be implemented as the same or several entities. For the specific implementation of the above various structures, please refer to the previous method embodiments, which will not be repeated here.

For the specific implementation of the above various operations, please refer to the previous embodiments, which will not be repeated here.

The method for controlling radiation delivery, the computer device and the storage medium according to the embodiments of the present application are described in detail above. The principles and embodiments of the present application are expounded by using specific examples herein. The descriptions of the above embodiments are only configured to help understand the method and its core idea of the present application. At the same time, according to the idea of the present application, there will be changes in the specific embodiments and application scope for those skilled in the art. In summary, the contents of the description should not be understood as limitations to the present application.

The invention claimed is:

1. A method for controlling a radiation delivery, comprising:
    acquiring a plurality of treatment plans for a target object; and
    sequentially sending, according to a preset delivery order of the plurality of treatment plans, control instructions corresponding to the plurality of treatment plans, so as to control radiation equipment to execute a radiation delivery corresponding to the plurality of treatment plans on the target object according to the preset delivery order.

2. The method according to claim 1, wherein the control instructions comprise a setup control instruction and radiation delivery control instructions;
    sequentially sending, according to the preset delivery order of the plurality of treatment plans, the control instructions corresponding to the plurality of treatment plans, so as to control the radiotherapy equipment to execute the radiation delivery corresponding to the plurality of treatment plans on the target object according to the preset delivery order comprises:
    sending, according to the preset delivery order of the plurality of treatment plans, the setup control instruction for an initial treatment plan in the plurality of treatment plans, so as to instruct to execute a setup on the target object; and
    determining that the setup on the target object is completed, and sequentially sending the radiation delivery control instructions corresponding to the plurality of treatment plans, so as to control the radiotherapy equipment to execute the radiation delivery corresponding to the plurality of treatment plans on the target object according to the preset delivery order.

3. The method according to claim 2, wherein the plurality of treatment plans comprises a first treatment plan and a second treatment plan, which are adjacent in the preset delivery order;
    determining that the setup on the target object is completed, and sequentially sending the radiation delivery control instructions corresponding to the plurality of treatment plans, so as to control the radiotherapy equipment to execute the radiation delivery corresponding to the plurality of treatment plans on the target object according to the preset delivery order comprises:
    sending the radiation delivery control instructions corresponding to the first treatment plan to control the radiotherapy equipment to execute a radiation delivery corresponding to the first treatment plan on the target object; and
    determining that the radiation delivery corresponding to the first treatment plan on the target object by the radiotherapy equipment is completed, and sending the radiation delivery control instructions corresponding to the second treatment plan to control the radiotherapy equipment to execute a radiation delivery corresponding to the second treatment plan on the target object.

4. The method according to claim 3, wherein determining that the radiation delivery corresponding to the first treatment plan on the target object by the radiotherapy equipment is completed comprises:
    determining, according to a radiation delivery state corresponding to the first treatment plan, that the radiation delivery corresponding to the first treatment plan on the target object by the radiotherapy equipment is completed.

5. The method according to claim 4, wherein determining, according to the radiation delivery state corresponding to the first treatment plan, that the radiation delivery corresponding to the first treatment plan on the target object by the radiotherapy equipment is completed comprises:
    acquiring the radiation delivery state corresponding to the first treatment plan; and
    determining, in a case that the radiation delivery state corresponding to the first treatment plan is a preset state, that the radiation delivery corresponding to the first treatment plan on the target object by the radiotherapy equipment is completed; wherein the preset state indicates that the radiation delivery corresponding to the first treatment plan is completed.

6. The method according to claim 3, further comprising:
    before sending the radiation delivery control instructions corresponding to the second treatment plan to control the radiotherapy equipment to execute a radiation delivery corresponding to the second treatment plan on the target object, determining that the second treatment plan exists.

7. The method according to claim 1, further comprising:
    after acquiring the plurality of treatment plans for the target object, analyzing the plurality of treatment plans for the target object.

8. The method according to claim 1, further comprising:
after acquiring the plurality of treatment plans for the target object,
acquiring the preset delivery order of the plurality of treatment plans.

9. A computer device comprising:
one or more processors and a memory storing one or more application programs therein; wherein
the one or more processors, when loading and running the one or more application programs, are caused to perform:
acquiring a plurality of treatment plans for a target object; and
sequentially sending, according to a preset delivery order of the plurality of treatment plans, control instructions corresponding to the plurality of treatment plans, so as to control radiation equipment to execute a radiation delivery corresponding to the plurality of treatment plans on the target object according to the preset delivery order.

10. The computer device according to claim 9, wherein the control instructions comprise a setup control instruction and radiation delivery control instructions;
and the one or more processors, when loading and running the one or more application programs, are further caused to perform:
sending, according to the preset delivery order of the plurality of treatment plans, the setup control instruction for an initial treatment plan in the plurality of treatment plans, so as to instruct to execute a setup on the target object; and
determining that the setup on the target object is completed, and sequentially sending the radiation delivery control instructions corresponding to the plurality of treatment plans, so as to control the radiotherapy equipment to execute the radiation delivery corresponding to the plurality of treatment plans on the target object according to the preset delivery order.

11. The computer device according to claim 10, wherein the plurality of treatment plans comprises a first treatment plan and a second treatment plan, which are adjacent in the preset delivery order;
and the one or more processors, when loading and running the one or more application programs, are further caused to perform:
sending the radiation delivery control instructions corresponding to the first treatment plan to control the radiotherapy equipment to execute a radiation delivery corresponding to the first treatment plan on the target object; and
determining that the radiation delivery corresponding to the first treatment plan on the target object by the radiotherapy equipment is completed, and sending the radiation delivery control instructions corresponding to the second treatment plan to control the radiotherapy equipment to execute a radiation delivery corresponding to the second treatment plan on the target object.

12. The computer device according to claim 11, wherein the one or more processors, when loading and running the one or more application programs, are further caused to perform:
determining, according to a radiation delivery state corresponding to the first treatment plan, that the radiation delivery corresponding to the first treatment plan on the target object by the radiotherapy equipment is completed.

13. The computer device according to claim 12, wherein the one or more processors, when loading and running the one or more application programs, are further caused to perform:
acquiring the radiation delivery state corresponding to the first treatment plan; and
determining, in a case that the radiation delivery state corresponding to the first treatment plan is a preset state, that the radiation delivery corresponding to the first treatment plan on the target object by the radiotherapy equipment is completed; wherein the preset state indicates that the radiation delivery corresponding to the first treatment plan is completed.

14. The computer device according to claim 11, wherein the one or more processors, when loading and running the one or more application programs, are further caused to perform: determining that the second treatment plan exists.

15. The computer device according to claim 9, wherein the one or more processors, when loading and running the one or more application programs, are further caused to perform:
analyzing the plurality of treatment plans for the target object.

16. The computer device according to claim 9, wherein the one or more processors, when loading and running the one or more application programs, are further caused to perform:
acquiring the preset delivery order of the plurality of treatment plans.

17. A non-transitory computer-readable storage medium storing one or more computer programs therein, wherein the one or more computer programs, when loaded and run by a processor, cause the processor to perform:
acquiring a plurality of treatment plans for a target object; and
sequentially sending, according to a preset delivery order of the plurality of treatment plans, control instructions corresponding to the plurality of treatment plans, so as to control radiation equipment to execute a radiation delivery corresponding to the plurality of treatment plans on the target object according to the preset delivery order.

18. The non-transitory computer-readable storage medium according to claim 17, wherein the control instructions comprise a setup control instruction and radiation delivery control instructions;
and the one or more computer programs, when loaded and run by the processor, further cause the processor to perform:
sending, according to the preset delivery order of the plurality of treatment plans, the setup control instruction for an initial treatment plan in the plurality of treatment plans, so as to instruct to execute a setup on the target object; and
determining that the setup on the target object is completed, and sequentially sending the radiation delivery control instructions corresponding to the plurality of treatment plans, so as to control the radiotherapy equipment to execute the radiation delivery corresponding to the plurality of treatment plans on the target object according to the preset delivery order.

19. The non-transitory computer-readable storage medium according to claim 18, wherein the plurality of treatment plans comprises a first treatment plan and a second treatment plan, which are adjacent in the preset delivery order;

and the one or more computer programs, when loaded and run by the processor, further cause the processor to perform:

sending the radiation delivery control instructions corresponding to the first treatment plan to control the radiotherapy equipment to execute a radiation delivery corresponding to the first treatment plan on the target object; and determining that the radiation delivery corresponding to the first treatment plan on the target object by the radiotherapy equipment is completed, and sending the radiation delivery control instructions corresponding to the second treatment plan to control the radiotherapy equipment to execute a radiation delivery corresponding to the second treatment plan on the target object.

20. The non-transitory computer-readable storage medium according to claim 19, wherein the one or more computer programs, when loaded and run by the processor, further cause the processor to perform:

determining, according to a radiation delivery state corresponding to the first treatment plan, that the radiation delivery corresponding to the first treatment plan on the target object by the radiotherapy equipment is completed.

* * * * *